US011300938B2

(12) United States Patent
Matsunaga et al.

(10) Patent No.: US 11,300,938 B2
(45) Date of Patent: Apr. 12, 2022

(54) INFORMATION PROCESSING DEVICE, INFORMATION PROCESSING METHOD, AND INFORMATION PROCESSING SYSTEM

(71) Applicant: HONDA MOTOR CO., LTD., Tokyo (JP)

(72) Inventors: Yoshihiro Matsunaga, Wako (JP); Sho Takada, Wako (JP); Mitsuhiro Ito, Wako (JP); Nobuyuki Sasaki, Wako (JP); Ryo Oshima, Wako (JP); Mio Oshima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 108 days.

(21) Appl. No.: 17/007,252

(22) Filed: Aug. 31, 2020

(65) Prior Publication Data
US 2020/0401095 A1    Dec. 24, 2020

Related U.S. Application Data

(63) Continuation of application No. PCT/JP2018/044020, filed on Nov. 29, 2018.

(30) Foreign Application Priority Data

Mar. 20, 2018  (JP) .............................. JP2018-052590

(51) Int. Cl.
*G05B 19/042* (2006.01)
*H02J 13/00* (2006.01)

(52) U.S. Cl.
CPC ...... *G05B 19/042* (2013.01); *H02J 13/00002* (2020.01); *H02J 13/00022* (2020.01); *G05B 2219/2639* (2013.01)

(58) Field of Classification Search
CPC .......................... B41M 5/1455; B41M 5/3275
See application file for complete search history.

(56) References Cited

U.S. PATENT DOCUMENTS

2008/0296976 A1* 12/2008 Wright ................... H02J 3/008
                                                                318/143
2008/0297075 A1* 12/2008 Wright ................... B60L 50/10
                                                                318/149
(Continued)

FOREIGN PATENT DOCUMENTS

JP       2008104310 A     5/2008
JP       2014233133 A    12/2014
(Continued)

OTHER PUBLICATIONS

International Search Report for PCT/JP2018/044020 dated Jan. 29, 2018.

*Primary Examiner* — Ramesh B Patel
(74) *Attorney, Agent, or Firm* — Thomas | Horstemeyer, LLP

(57) ABSTRACT

An information processing device includes: a reception unit configured to receive operation information on a power supply device from the power supply device that supplies power to an electric apparatus detachably connected thereto; a ranking unit configured to rank a user of the power supply device based on the received operation information; and a setting unit configured to set an incentive to the user based on a rank of the ranked user. The operation information includes: fuel consumption information indicating a fuel consumption amount of an engine generator; and measurement information indicating measurement results of voltage and current that the power supply device is supplying to the electric apparatus. The ranking unit identifies fuel consump- (Continued)

tion based on the fuel consumption information and the measurement information, and ranks the user based on the identified fuel consumption.

7 Claims, 9 Drawing Sheets

(56) References Cited

U.S. PATENT DOCUMENTS

| | | | | |
|---|---|---|---|---|
| 2012/0249068 | A1* | 10/2012 | Ishida | H02J 3/32 |
| | | | | 320/109 |
| 2020/0301460 | A1* | 9/2020 | Mitsutani | H02J 7/0063 |
| 2020/0339004 | A1* | 10/2020 | Oshima | G06Q 20/367 |
| 2020/0358287 | A1* | 11/2020 | Takada | G06Q 20/145 |
| 2020/0393519 | A1* | 12/2020 | Matsunaga | H02J 7/00 |
| 2020/0401095 | A1* | 12/2020 | Matsunaga | G06Q 50/06 |
| 2020/0402086 | A1* | 12/2020 | Oshima | G06Q 10/10 |

FOREIGN PATENT DOCUMENTS

| | | |
|---|---|---|
| JP | 2015186290 A | 10/2015 |
| WO | 2019181075 A1 | 9/2019 |

* cited by examiner

FIG. 4A

| TOTAL POWER SUPPLY AMOUNT RANKING ||
|---|---|
| 1 | B0051 |
| 2 | E2015 |
| 3 | ... |
| ... | ... |

FIG. 4B

| FUEL CONSUMPTION RANKING ||
|---|---|
| 1 | X2001 |
| 2 | Y3020 |
| 3 | ... |
| ... | ... |

FIG. 4C

| POWER SUPPLY TIME RANKING ||
|---|---|
| 1 | M0084 |
| 2 | V0629 |
| 3 | ... |
| ... | ... |

FIG. 5A

| SMALL HOUSEHOLD APPLIANCE RANKING ||
|---|---|
| 1 | ... |
| 2 | ... |
| 3 | ... |
| ... | ... |

FIG. 5B

| LARGE HOUSEHOLD APPLIANCE RANKING ||
|---|---|
| 1 | ... |
| 2 | ... |
| 3 | ... |
| ... | ... |

FIG. 5C

| SMALL BUSINESS APPARATUS RANKING ||
|---|---|
| 1 | ... |
| 2 | ... |
| 3 | ... |
| ... | ... |

FIG. 5D

| LARGE BUSINESS APPARATUS RANKING ||
|---|---|
| 1 | ... |
| 2 | ... |
| 3 | ... |
| ... | ... |

INFORMATION PROCESSING DEVICE, INFORMATION PROCESSING METHOD, AND INFORMATION PROCESSING SYSTEM

CROSS-REFERENCE TO RELATED APPLICATION(S)

This application is a continuation of International Patent Application No. PCT/JP2018/044020 filed on Nov. 29, 2018, which claims priority to and the benefit of Japanese Patent Application No. 2018-052590 filed on Mar. 20, 2018, the entire disclosures of which are incorporated herein by reference.

BACKGROUND OF THE INVENTION

Field of the Invention

The present invention relates to an information processing technique related to a power supply device.

Description of the Related Art

Techniques for managing power supplied to electric apparatuses have been proposed. For example, Japanese Patent Laid-Open No. 2008-104310 discloses a technique for calculating an allowable amount of power that can be supplied to an electric apparatus and keeping power consumption of the electric apparatus from exceeding the allowable amount of power.

Power supply devices such as generators and power storage devices are known as devices for supplying power to electric apparatuses. Such power supply devices can function as emergency power sources or energy resources forming a VPP (Virtual Power Plant), and it is hoped that they become more widespread in the future. However, mechanisms that contribute to promotion of utilization of the power supply devices have not been proposed much.

SUMMARY OF THE INVENTION

An object of the present invention is to provide a technique that contributes to promotion of utilization of power supply devices.

According to an aspect of the present invention, there is provided an information processing device, comprising: a reception unit configured to receive operation information on a power supply device from the power supply device that supplies power to an electric apparatus detachably connected thereto; a ranking unit configured to rank a user of the power supply device based on the received operation information; and a setting unit configured to set an incentive to the user based on a rank of the ranked user, wherein when the power supply device includes an engine generator, the operation information includes: fuel consumption information indicating a fuel consumption amount of the engine generator; and measurement information indicating measurement results of voltage and current that the power supply device is supplying to the electric apparatus, and wherein the ranking unit identifies fuel consumption of the engine generator based on the fuel consumption information and the measurement information, and ranks the user based on the identified fuel consumption.

Further features of the present invention will become apparent from the following description of exemplary embodiments (with reference to the attached drawings).

BRIEF DESCRIPTION OF THE DRAWINGS

FIG. 4A is a diagram showing an example of ranking.
FIG. 4B is a diagram showing an example of ranking.
FIG. 4C is a diagram showing an example of ranking.
FIG. 5A is a diagram showing an example of ranking.
FIG. 5B is a diagram showing an example of ranking.
FIG. 5C is a diagram showing an example of ranking.
FIG. 5D is a diagram showing an example of ranking.

DESCRIPTION OF THE EMBODIMENTS

Figure 1:
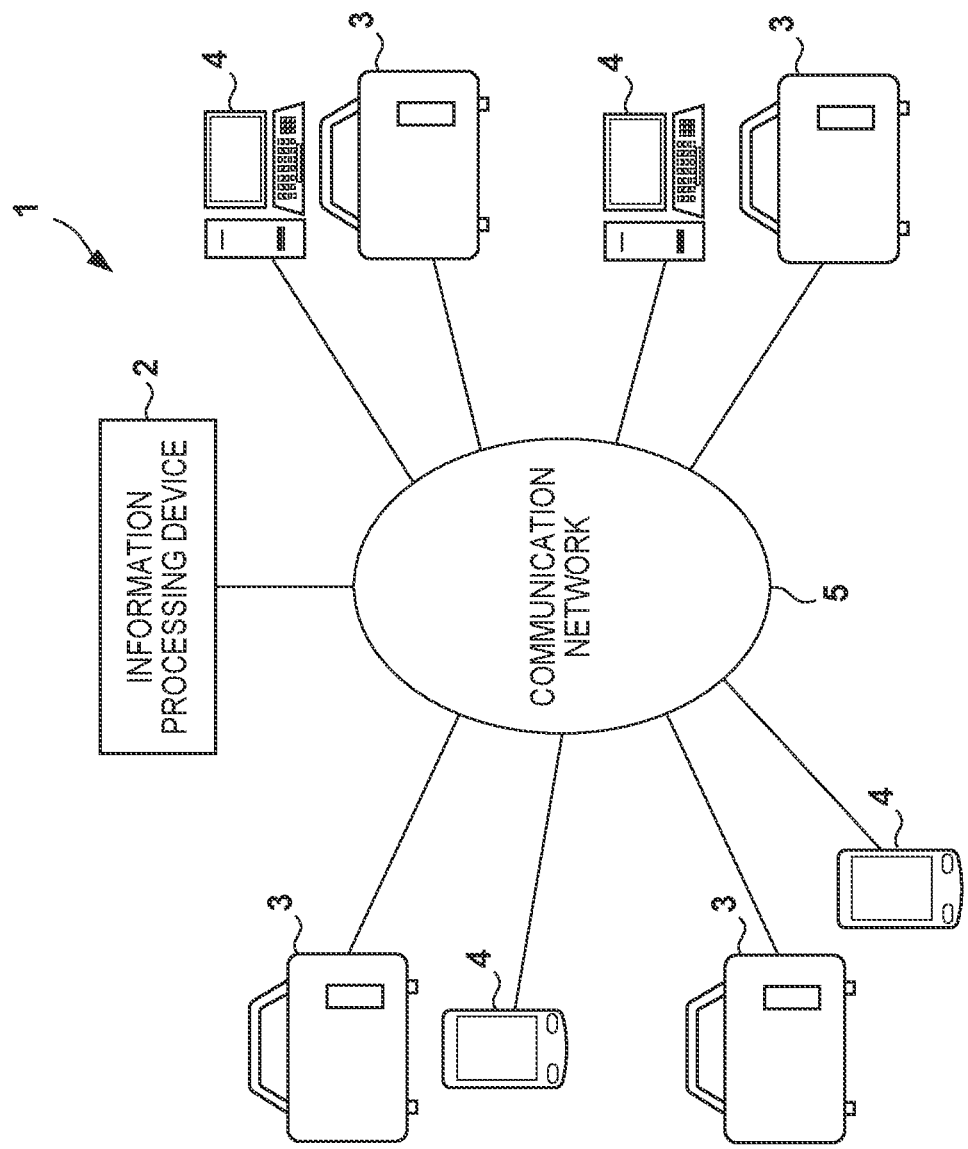
FIG. 1 is a schematic diagram of an information processing system.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

<System Configuration>

FIG. 1 is a schematic diagram of an information processing system 1. The information processing system 1 includes an information processing device 2, a plurality of power supply devices 3, and a plurality of terminals 4 that are communicatively connected via a communication network 5. Although four power supply devices 3 are illustrated in the shown example, a large number of power supply devices 3 can be included in the system 1.

The information processing device 2 is a computer that functions as an information processing server in the information processing system 1. Each of the power supply devices 3 is a device that supplies power to an electric apparatus, and is assumed to be a transportable power supply device in the case of this embodiment, but may be a stationary power supply device. The transportable power supply device would be able to be transported to a place of use according to a user's use such as leisure, business, or emergency. The power supply device 3 may be an object owned or rented by the user.

Each of the terminals 4 is a computer used by the user of the power supply device 3, and is, for example, a PC or a mobile terminal. The terminal 4 includes a display device and a communication device. In the case of the embodiment, information provided to the user of the power supply device 3 is transmitted from the information processing device 2 to the terminal 4. However, it can be also transmitted to the power supply device 3 depending on a function of the power supply device 3. Alternatively, the user may be able to select either the terminal 4 or the power supply device 3 as a transmission destination of the information.

In the information processing system 1, the information processing device 2 collects operation information on an operation aspect from the power supply device 3 via the communication network 5 such as the Internet, ranks the user of the power supply device 3 from the collected information, and gives the user an incentive according to a rank. Information on the ranking and the incentive is provided to the terminal 4. The incentive can be an object of, for example, a discount at the time of replacement, a discount on a maintenance cost of the power supply device 3, or a discount on a rental fee. Giving the incentive allows utilization of power supply device 3 by the user to be promoted.

The information processing device 2 can be operated by, for example, a developer or a rental company of the power supply device 3. Since these companies can obtain information related to an actual state of the operation aspect of the power supply device 3, they can use it as future development materials and sales materials. Since the utilization of the power supply device 3 is promoted, the numbers of units sold and rented can be increased. When the power supply device 3 becomes widespread, chances of functioning as a power source in an emergency or as an energy resource included in a VPP increase, and it can also contribute to society.

<Power Supply Device>

Figure 2:
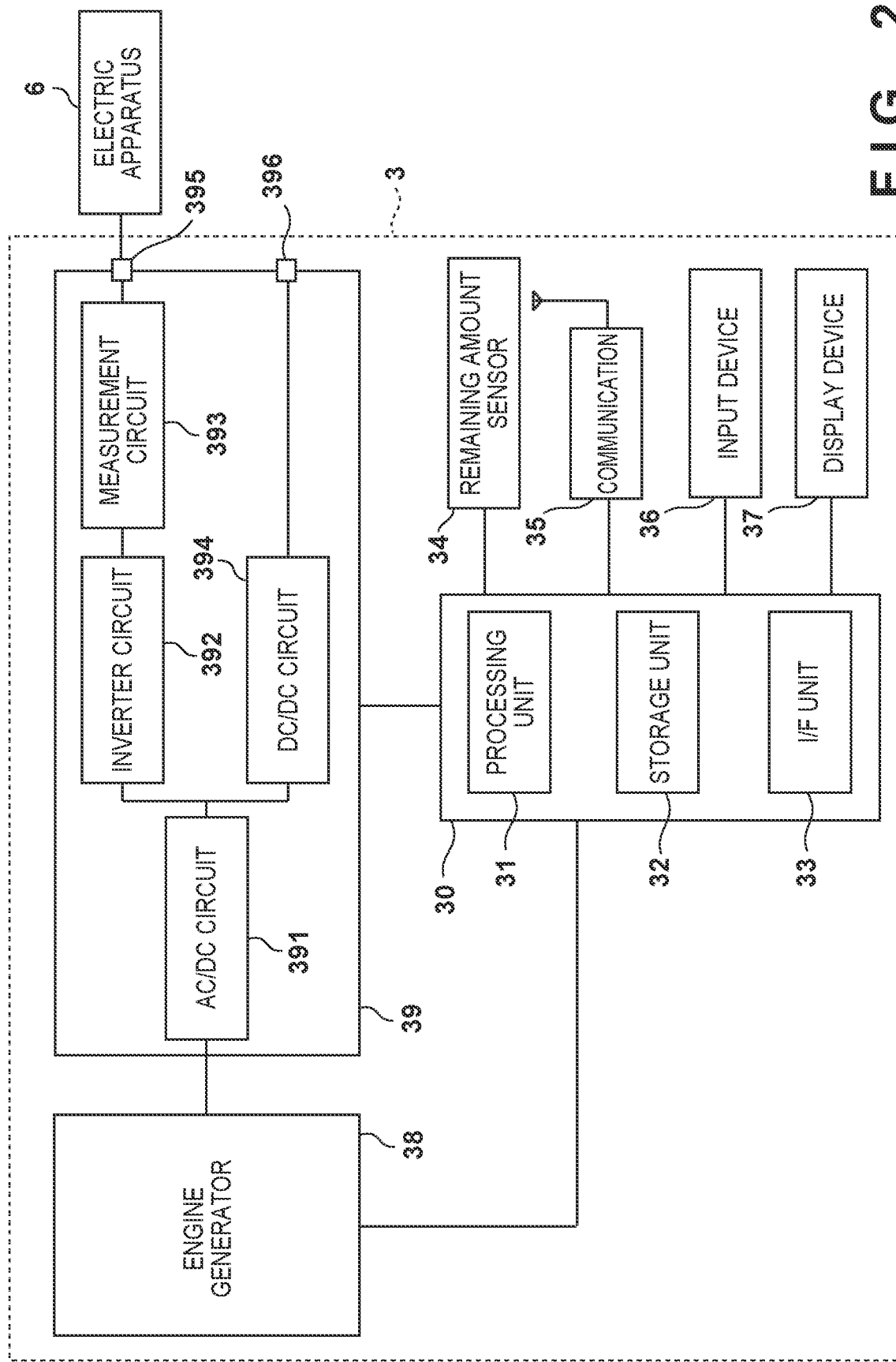
FIG. 2 is a block diagram of a power supply device according to one embodiment of the present invention.

FIG. 2 is a block diagram of the power supply device 3. The power supply device 3 of the embodiment is a generator-type power supply device including an engine generator 38. The engine generator 38 of the embodiment generates AC power driven by fuel. The fuel is, for example, gasoline, liquefied petroleum gas, or hydrogen.

A power supply circuit 39 is a circuit that converts voltage generated by the engine generator 38 into predetermined AC and DC. An AC/DC circuit 391 includes a rectifying/smoothing circuit or the like that rectifies and smooths AC generated by the engine generator 38. An inverter circuit 392 is a circuit that converts DC output from the AC/DC circuit 391 into stable AC having a predetermined frequency.

A measurement circuit 393 includes a current sensor and a voltage sensor, measures AC voltage and AC current supplied from the inverter circuit 392 to an electric apparatus 6 connected to an AC outlet 395, and outputs measurement results to a control circuit 30. The measurement objects of the measurement circuit 393 may be either current or voltage depending on a utilization aspect of the measurement results.

The electric apparatus 6 that can be driven by AC power is detachably connected to the AC outlet 395. As the electric apparatus 6, when the power supply device 3 is used for leisure, an electric load such as a cooker, an air conditioner, a television, a lighting fixture, or a dryer can be mentioned. As the cooker, a hot plate, a kettle, a microwave oven, a grill, a mixer, or the like can be mentioned. When the power supply device 3 is used for business, an electric load such as a power tool, a large lighting device, or a compressor can be mentioned.

A DC/DC circuit 394 converts a level of DC voltage output from the AC/DC circuit 391, supplies an operation voltage to the control circuit 30 or the like, and outputs from a DC outlet 396. The electric apparatus 6 that can be driven by DC power is detachably connected to the DC outlet 396.

The control circuit 30 is a circuit that controls the power supply device 3. The control circuit 30 includes a process unit 31, a storage unit 32, and an IF (interface) unit 33. The processing unit 31 is a processor typified by a CPU, and executes a program stored in the storage unit 32. The storage unit 32 is a storage device such as a RAM, a ROM, or a hard disk. The storage unit 32 stores various types of data in addition to the program executed by the processing unit 31. The I/F unit 33 relays transmission and reception of signals between an external device and the processing unit 31.

A remaining amount sensor 34 detects a remaining amount of fuel in the engine generator 38. The remaining amount sensor 34 can be provided in a fuel tank that stores fuel. Fuel consumption of the engine generator 38 can be calculated from a fuel consumption amount detected by the remaining amount sensor 34 and a power consumption amount of the electric apparatus 6 measured by the measurement circuit 393.

A communication device 35 is a wireless communication device that performs information communication with the information processing device 2 via the communication network 5. The communication device 35 may be a wired communication device. An input device 36 is a device that receives an operation input of the user of the power supply device 3, and is, for example, a plurality of switches. A display device 37 is a device that displays information to the user of the power supply device 3, and is, for example, an image display device, such as a liquid crystal display device, or a light-emitting element, such as an LED.

The processing unit 31 transmits the detection result of the remaining amount sensor 34 and the measurement results of the measurement circuit 393 to the information processing device 2 by the communication device 35 as the operation information of the power supply device 3. The actual detection result and measurement results can be used for later-described ranking, and ranking accuracy can be improved.

The measurement results of the measurement circuit 393 can be also used as information related to a type of the electric apparatus 6 connected to the AC outlet 395 of the power supply device 3, and in particular, can be used for estimating the type. The estimation of the type is effective when the type of the electric apparatus 6 is distinguished and the user is ranked according to the type at the time of ranking. The power supplied to the electric apparatus 6 shows a waveform characterized by the type of the electric apparatus 6. The type of the connected electric apparatus 6 can be estimated from its feature quantity. The feature quantity is, for example, apparent power and power factor. The power factor is found by dividing effective power by the apparent power, or is found as a cosine ($\cos \theta$) of a phase difference between voltage and current. In the latter case, the measurement circuit 393 measures the phase difference $\theta$. Furthermore, the feature quantity may include a time from start of the electric apparatus 6 to stable operation, or a peak value of start current flowing through the electric apparatus 6 when the electric apparatus 6 starts. By converting a relationship between the type of the electric apparatus 6 and the feature quantity into data in advance as a feature quantity map and comparing the feature quantity map with a feature quantity measured with the measurement circuit 393, the type of the electric apparatus 6 can be estimated. The type of the electric apparatus 6 can be also estimated by applying a known apparatus separation technique.

<Information Processing Device>

Figure 3:
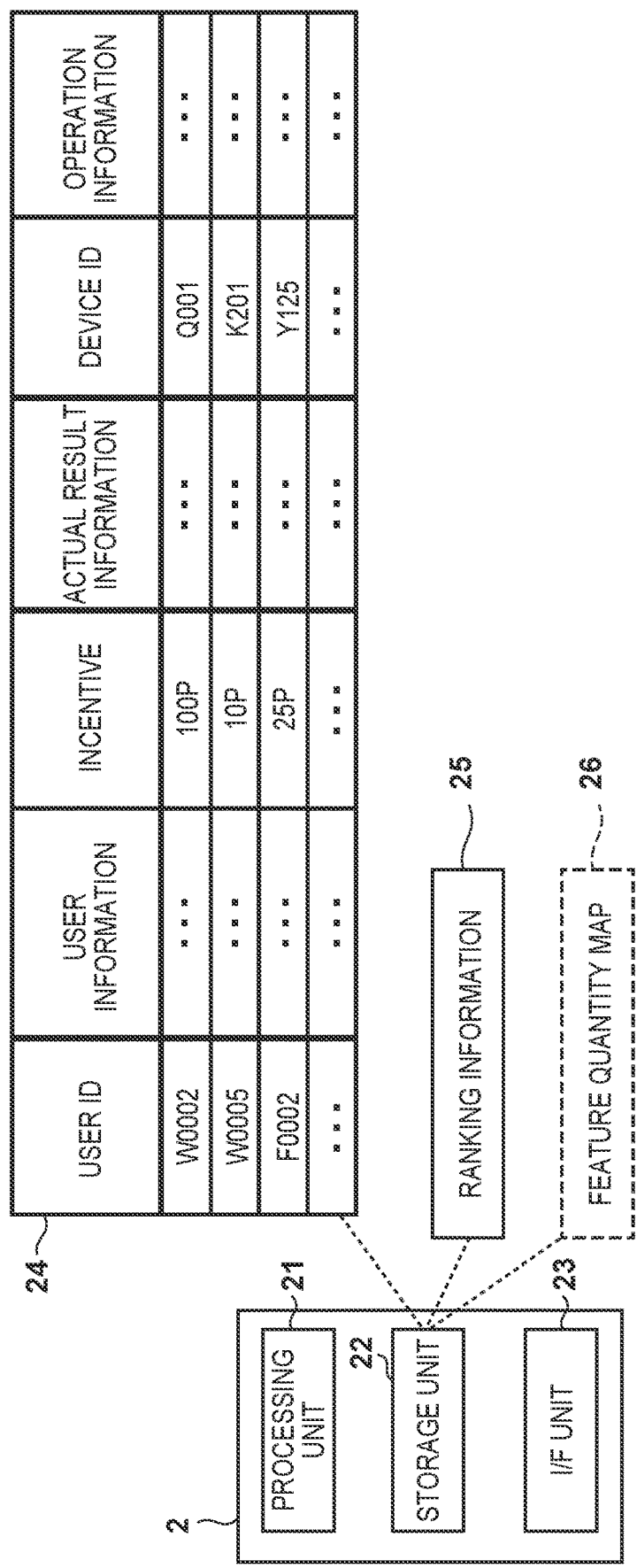
FIG. 3 is a block diagram of an information processing device according to one embodiment of the present invention.

FIG. 3 is a block diagram of the information processing device 2. The information processing device 2 includes a process unit 21, a storage unit 22, and an I/F (interface) unit 23. The processing unit 21 is a processor typified by a CPU, and executes a program stored in the storage unit 22. The/F unit 23 relays transmission and reception of signals between an external device and the processing unit 21. The I/F unit 23 includes a wired or wireless communication interface capable of communicating with the power supply devices 3 and the terminals 4 via the communication network 5. The storage unit 22 is a storage device such as a RAM, a ROM, or a hard disk.

The storage unit 22 stores various types of data in addition to the program executed by the processing unit 21. In the example of FIG. 3, databases 24 to 26 are illustrated as data stored in the storage unit 22. The database 26 shown by a broken line is illustrated as a database that is optionally constructed, and is constructed when the type of the electric apparatus 6 is estimated as described above.

The database 24 is a database that has accumulated data on the power supply devices 3 and their users. "User ID" is an identifier assigned in advance to identify the user of the power supply device 3. "User information" is information on the user, and can include information, such as a name, an address, or an email address. "Incentive" is information on an incentive given to the user, and an amount of the incentive is indicated by a point number in the example of the figure. The incentive is added by setting by a process of S23 of FIG. 7 described later. Although not specifically described, when the user consumes the incentive, the value of the "incentive" is subtracted.

"Actual result information" is information on an evaluation value of the user's ranking evaluation target, and is information on an evaluation value related to an actual use result of the power supply device 3. The evaluation target may be one type or may be a plurality of types. By setting a plurality of types for the ranking evaluation target, it is possible to increase chances of ranking each user in a higher place of ranking, and further promote utilization of the power supply device 3. Examples of the ranking evaluation target will be described later together with the database 25.

"Device ID" is an identifier assigned in advance to identify the individual power supply device 3. "Operation information" accumulates operation information received from the power supply device 3 or a link to a storage area of the operation information in the storage unit 22.

The database 25 is a database that accumulates ranks of the users of the power supply devices 3. FIGS. 4A-4C show examples of ranking accumulated in the database 25, and ranking evaluation targets and IDs of high-ranking users are shown.

In FIG. 4A, the ranking evaluation target is a total power supply amount. The total power supply amount is a total amount of power supplied from the power supply device 3 to the electric apparatus 6 in a predetermined period as one unit. The predetermined period is a period for fixing the ranking, and can be set to an arbitrary prescribed period, for example, several hours, half a day, one day, or one week. The total power supply amount can be identified by calculating from the measurement results of the measurement circuit 393 and its supply time. A user with a large total power supply amount uses the power supply device 3 to that extent, so this is evaluated. More incentives can be given to users higher in rank.

In FIG. 4B, the ranking evaluation target is fuel consumption. The fuel consumption can be an average value of fuel consumption of the engine generator 38 in a predetermined period as one unit. The fuel consumption can be identified by calculating, for example, from the following formula.

> The fuel consumption=the power supply amount to the electric apparatus 6/the fuel consumption amount of the engine generator 38.

The power supply amount can be calculated from the measurement results of the measurement circuit 393, and the fuel consumption amount can be calculated from the detection result of the remaining amount sensor 34. The predetermined period is a period for fixing the ranking, and can be set to an arbitrary prescribed period, for example, several hours, half a day, one day, or one week. A user who uses it in a good fuel consumption way uses the power supply device 3 efficiently, so this is evaluated. More incentives can be given to users higher in rank.

In FIG. 4C, the ranking evaluation target is a power supply time. The power supply time is a total time during which power is supplied from the power supply device 3 to the electric apparatus 6 in a predetermined period as one unit. The time may be only a continuous time or may be the sum of supply times regardless of whether it is continuous or not. The predetermined period is a period for fixing the ranking, and can be set to an arbitrary prescribed period, for example, one day or one week. The power supply time can be identified by calculating from supply start time and end time indicated by the measurement results of the measurement circuit 393. The magnitude of supplied power does not matter here. A user with along power supply time uses the power supply device 3 for a long time to that extent, so this is evaluated. More incentives can be given to users higher in rank.

These ranking evaluation targets are likely to bias users of a specific use toward higher ranks. For example, the total power supply amount is likely to rank users of the business use such as work sites and construction sites higher in rank than users of the leisure use. On the contrary, fuel consumption is likely to rank users of the leisure use higher in rank. Therefore, regarding each ranking evaluation target, ranking may be divided according to the type of the electric apparatus 6. FIGS. 5A-5D show an example thereof, and ranking for each of the types of the electric apparatuses 6 of FIGS. 5A-5D can be set for each of the three types of ranking evaluation targets illustrated in FIGS. 4A-4C.

FIGS. 5A and 5B assume the power supply devices 3 for the leisure use, and the power supply devices 3 are classified into a small household appliance and a large household appliance. As the small household appliance, a dryer, a kettle, or the like can be mentioned. As the large household appliance, an air conditioner, a television, a microwave oven, or the like can be mentioned. FIGS. 5C and 5D assume the power supply devices 3 for the business use, and the power supply devices 3 are classified into a small business apparatus and a large business apparatus. As the small business apparatus, a small lighting device, a power tool, or the like can be mentioned. As the large business apparatus, a large lighting device, a compressor, or the like can be mentioned. In the examples of FIGS. 5A-5D, they are classified according to small size, large size, leisure use, and business use, but they may be classified according to lower concepts (for example, types of products such as a hot plate and a kettle) or higher concepts (for example, division into two of small size and large size).

In order to classify the ranking by the types of the electric apparatuses 6 as described above, it is necessary to identify the type of the electric apparatus 6 connected to the power supply device 3. The estimation method described above can be used to identify the type. In this case, as shown in the database 26, a database that has accumulated the feature quantity map is prepared. The processing unit 21 collates the measurement results of the measurement circuit 393 included in the operation information transmitted from the power supply device 3 with the feature quantity map, and can estimate the electric apparatus 6 currently connected to the power supply device 3.

The operation information transmitted from the power supply device 3 may be the measurement results of the measurement circuit 393 and the detection result of the remaining amount sensor 34 as is, or may only include data after processing in which an amount of data is reduced within a range necessary for ranking. For example, the total power supply amount, the fuel consumption, and the power supply time illustrated in FIGS. 4A-4C are calculated on the power supply device 3 side and transmitted to the information processing device 2 as the operation information, and the information processing device 2 may identify the received information as the total power supply amount, the fuel consumption, and the power supply time. Similarly, the type of the electric apparatus 6 may be estimated on the power supply device 3 side. The operation information accumulated in the database 24 may be only the latest or may be information in a certain past period.

<Process Example>

Figure 6:
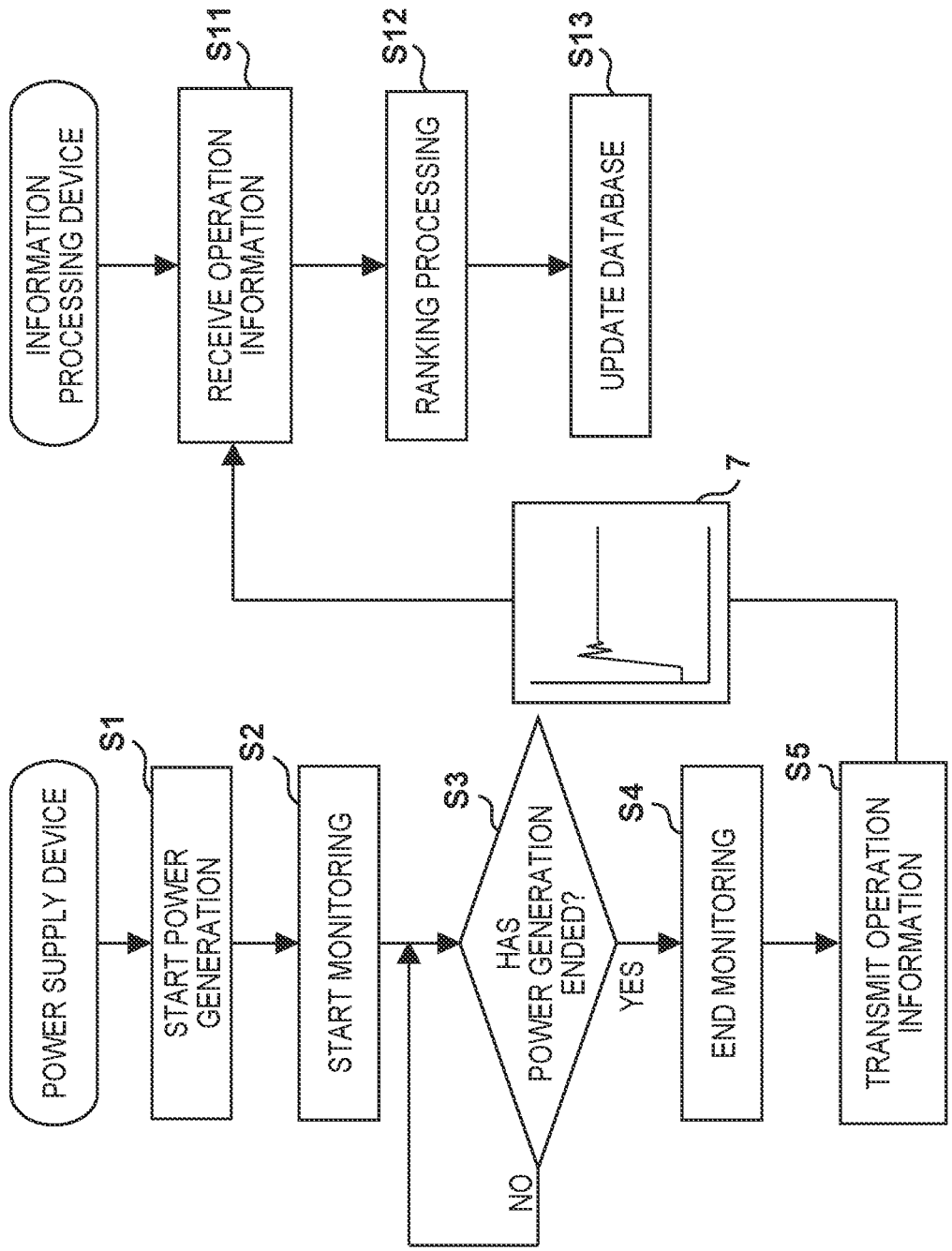
FIG. 6 is a flowchart showing a process example of the system of FIG. 1.

A process example of the information processing system 1 will be described. FIG. 6 shows a process example between the information processing device 2 and the power supply device 3, and shows a process example in which the information processing device 2 collects the operation information on the power supply device 3 and updates the databases 24 and 25. In the information processing device 2, the processing unit 21 performs a process, and in the power supply device 3, the processing unit 31 performs a process.

In S1, power generation of the engine generator 38 in the power supply device 3 is started. The engine generator 38 starts by, for example, the user's start operation. In S2, monitoring of the remaining amount sensor 34 and the measurement circuit 393 is started. When the monitoring is started, for example, the detection result of the remaining amount sensor 34 and the measurement results of the measurement circuit 393 are accumulated in the storage unit 32 together with time at a predetermined sampling cycle.

In S3, it is determined whether the power generation of the engine generator 38 has ended. When it has ended, the process proceeds to S4 to end monitoring. In S5, operation information 7 including the detection result of the remaining amount sensor 34 and the measurement results of the measurement circuit 393 accumulated in the storage unit 32 during the monitoring and the device ID of the power supply device 3 is transmitted to the information processing device 2. The operation information 7 is information indicating a use history of the power supply device 3 in the case of this example. For the purpose of reducing a communication amount, part of the detection result of the remaining amount sensor 34 and the measurement results of the measurement circuit 393 may be included in the operation information 7. For example, sampling may be increased during a period when supplied power fluctuation is large as seen at the time of connection or separation of the electric apparatus 6, whereas sampling may be reduced by thinning out data during a period when power supply to the electric apparatus 6 is stable.

In the case of the embodiment, the detection result of the remaining amount sensor 34 and the measurement results of the measurement circuit 393 are logged during use, and the operation information 7 is transmitted after the power generation ends, but the operation information including the detection result of the remaining amount sensor 34 and the measurement results of the measurement circuit 393 may be transmitted to the information processing device 2 in real time.

The information processing device 2 receives the operation information in S11. In S12, a ranking process is performed. Here, based on the operation information received in S11, the evaluation value for the ranking evaluation target is identified, and the user is ranked from the identified evaluation value.

For example, when the evaluation target is the total power supply amount described above, the total power supply amount of this time is calculated and identified from the operation information received in S11. Then, the actual result information is read from the database 24, the total power supply amount identified this time is added to the current total power supply amount accumulated in the actual result information, and the latest total power supply amount is identified. Further, the database 25 is referred to, and the rank of the user is identified for the latest total power supply amount.

For example, when the evaluation target is the fuel consumption described above, the fuel consumption of this time is calculated and identified from the operation information received in S11. Then, the actual result information is read from the database 24, an average value of the current fuel consumption accumulated in the actual result information and the fuel consumption identified this time is calculated, and the latest fuel consumption is identified. Further, the database 25 is referred to, and the rank of the user is identified for the latest fuel consumption.

For example, when the evaluation target is the power supply time described above, the power supply time of this time is calculated and identified from the operation information received in S11. Then, the actual result information is read from the database 24, the power supply time identified this time is added to the current power supply time accumulated in the actual result information, and the latest power supply time is identified. Further, the database 25 is referred to, and the rank of the user is identified for the latest power supply time.

When ranking is performed for each type of the electric apparatus 6, the electric apparatus 6 can be estimated in the ranking process in S12, and the evaluation value for the evaluation target can be calculated.

In S13, the databases 24 and 25 are updated based on a result of the ranking process in S12. That is, the current evaluation value of the actual result information in the database 24 is updated by the latest evaluation value for the evaluation target identified in the ranking process in S12. The ranking in the database 25 is updated by the rank of the user identified in the ranking process in S12. The ranking at this stage is an intermediate ranking, and not a final ranking. This ends one round of the processes.

Figure 7:
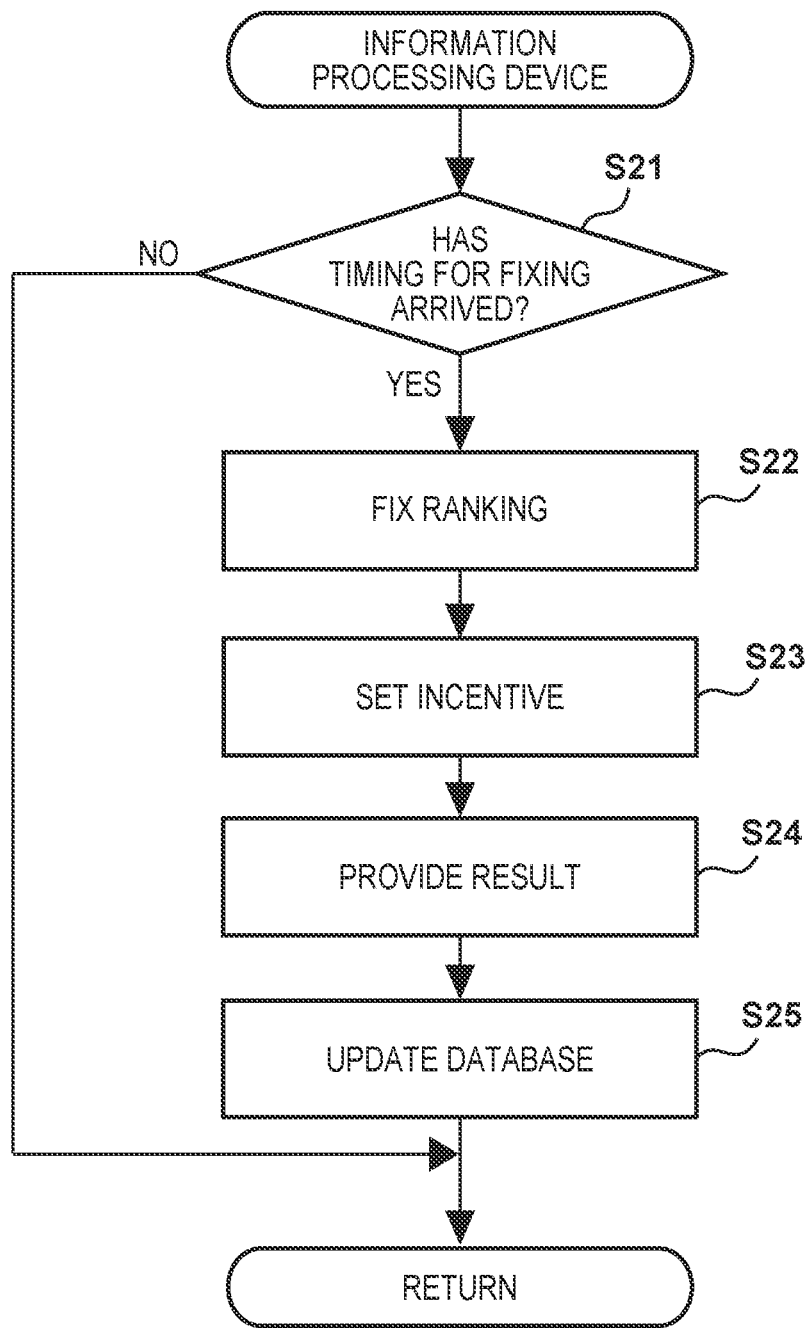
FIG. 7 is a flowchart showing a process example of the system of FIG. 1.

FIG. 7 is a flowchart showing a process example of the information processing device 2 when the ranking is fixed. In S21, it is determined whether timing for fixing the ranking has arrived. When the fixing timing has arrived, the process proceeds to S22, and when it has not, the process ends. When there are multiple types of evaluation targets, the fixing timing may be set for each type of evaluation targets.

In S22, the ranking accumulated in the database 25 is fixed. In S23, an incentive is set to users in each rank based on the ranking fixed in S22. Specifically, the incentive given to the users is added to the current values accumulated in the "incentive" of the database 24.

The incentive may be given only to users higher in rank, or may be given to all ranked users. Magnitude of the incentive may be given in units of individual ranks. This is a case of giving incentives like, for example, giving 100 points to a user of first-place, 90 points to a user of second-place, and so on. Alternatively, the incentive may be given to each group of ranks. This is a case of giving incentives like, for example, giving 100 points to users of first-place to tenth-place, 90 points to users of eleventh-place to twentieth-place, and so on. Basically, the incentive given to users lower in rank is 0 or relatively small, but a lot of incentives may be given to a user of a specific rank such as a booby award even if the rank is lower.

In S24, the user is provided with information on a ranking result and the given incentive. The information on the result can be provided by, for example, sending an email to the user's terminal 4. In the case of email, a transmission destination address can be stored in the "user information" of the database 24. As another example, when the terminal 4 makes a transmission request to the information processing device 2, the information on the result may be sent as its response. The user receives the information on the result and thereby can confirm the rank of themselves and the given amount of the incentive.

In S25, the databases 24 and 25 are updated. Here, the evaluation value for the evaluation target check grammar ranking is fixed accumulated in the "actual result information" of the database 24 is cleared. In addition, in the database 25, the ranking for the evaluation target check grammar ranking is fixed is cleared. This ends one round of the processes.

As described above, according to the embodiment, since the user is given the incentive by using the power supply device 3, its utilization is promoted. Since the operator of the information processing device 2 can obtain data related to the use aspect of the power supply device 3 as the operation information, they can use it for future developing materials or the like of the power supply device 3. When the power supply device 3 becomes widespread, chances of functioning as a power source in an emergency or as an energy resource included in the VPP increase, and it can also contribute to society.

Other Embodiments

<Other Information Process Example>

Although in the embodiment described above, the rank of the user is provided to the user when the ranking is fixed (S24), an intermediate ranking before it is fixed may be provided to the user. It is possible to further promote utilization of power supply device 3 for users who aim for higher ranks. In an intermediate ranking providing method, the intermediate ranking may be sent to the terminal 4 when the user's terminal 4 makes a request, or it may be periodically sent to the terminal 4 by email when predetermined timing arrives.

As another method, for example, the information processing device 2 may perform the evaluation process of S12 at a predetermined timing to generate evaluation information, and transmit it to the terminal 4. The timing can be designated in advance by the user by, for example, day, hour, and cycle, and this condition can be stored in the "user information" of the database 24. The information processing device 2 refers to the "user information" of the database 24, generates evaluation information when the designated timing comes, and sends the evaluation information to the terminal 4 by email or the like. In the case of email, a transmission destination address can be stored in the "user information" of the database 24. FIG. 7 is a flowchart showing one example thereof, and the processing unit 21 of the information processing device 2 performs it.

In S51, the "user information" of the database 24 is referred to and it is determined whether transmission timing has arrived. When the transmission timing has arrived, the process proceeds to S52, and when the transmission timing has not arrived, the process ends. In S52, the evaluation process is performed. The contents are the same as those of the evaluation process of S12. In S53, the evaluation information of the database 24 is updated and the evaluation information to be provided to the user is generated. In S54, the evaluation information generated in S53 is transmitted to the user's terminal 4. This ends the processes.

<Other Configuration Example of Power Supply Device>

Figure 8:
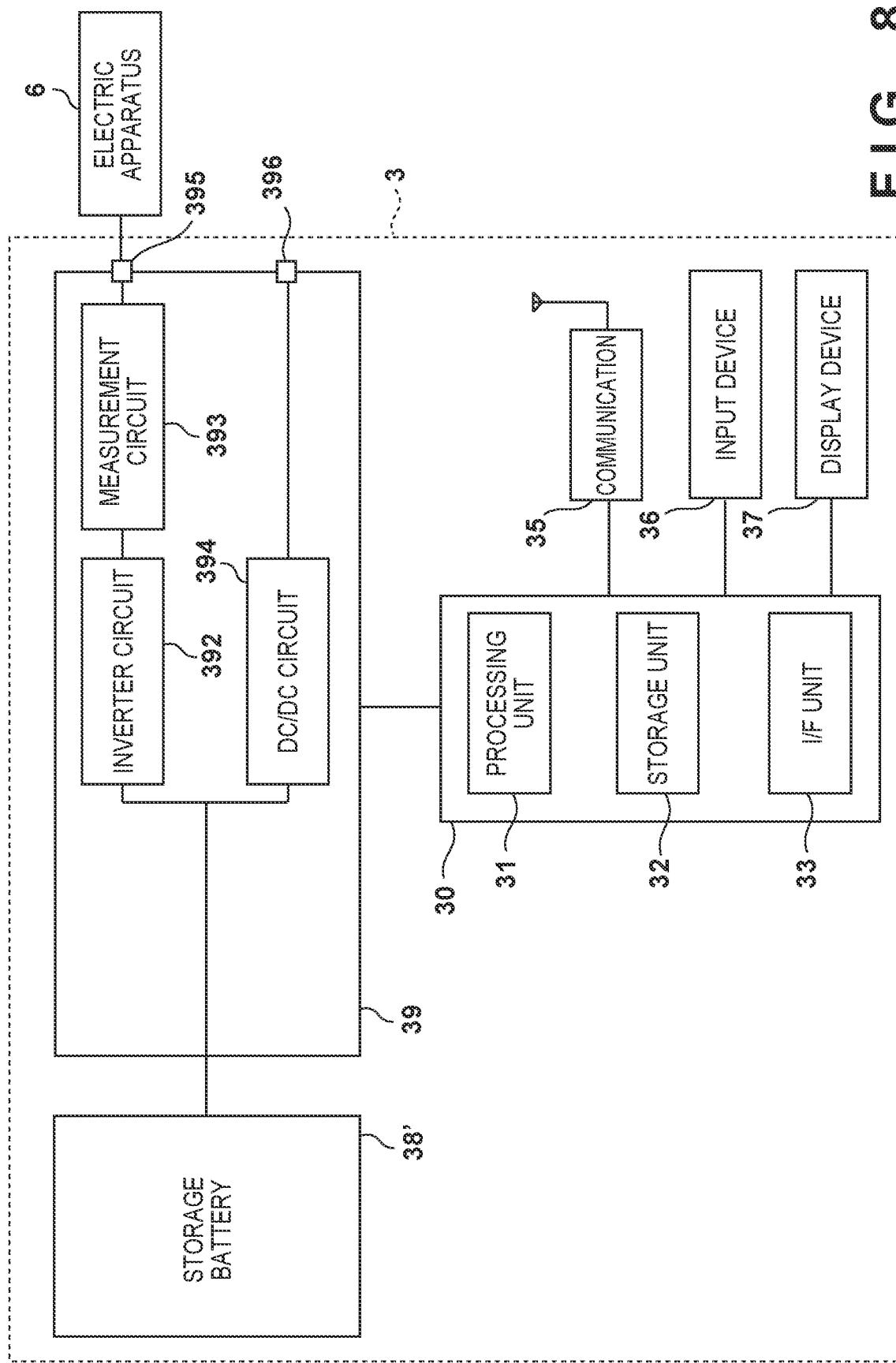
FIG. 8 is a block diagram of another power supply device.

The power supply device 3 illustrated in FIG. 2 includes the engine generator 38, but the configuration is not limited to this. FIG. 8 shows a power supply device 3 employing a storage battery 38' instead of the engine generator 38. Description of parts common to the example of FIG. 2 will be omitted. The storage battery 38' is, for example, a secondary battery such as a lithium-ion battery, and outputs a DC voltage such as 48 V to an inverter circuit 392 or a DC/DC circuit 394. As ranking evaluation targets of the power supply device 3 in the example of FIG. 8, the number of times of charging/discharging the storage battery 38' or the like can be mentioned in addition to the evaluation targets specific to the engine generator 38 among the evaluation targets described above.

Figure 9:
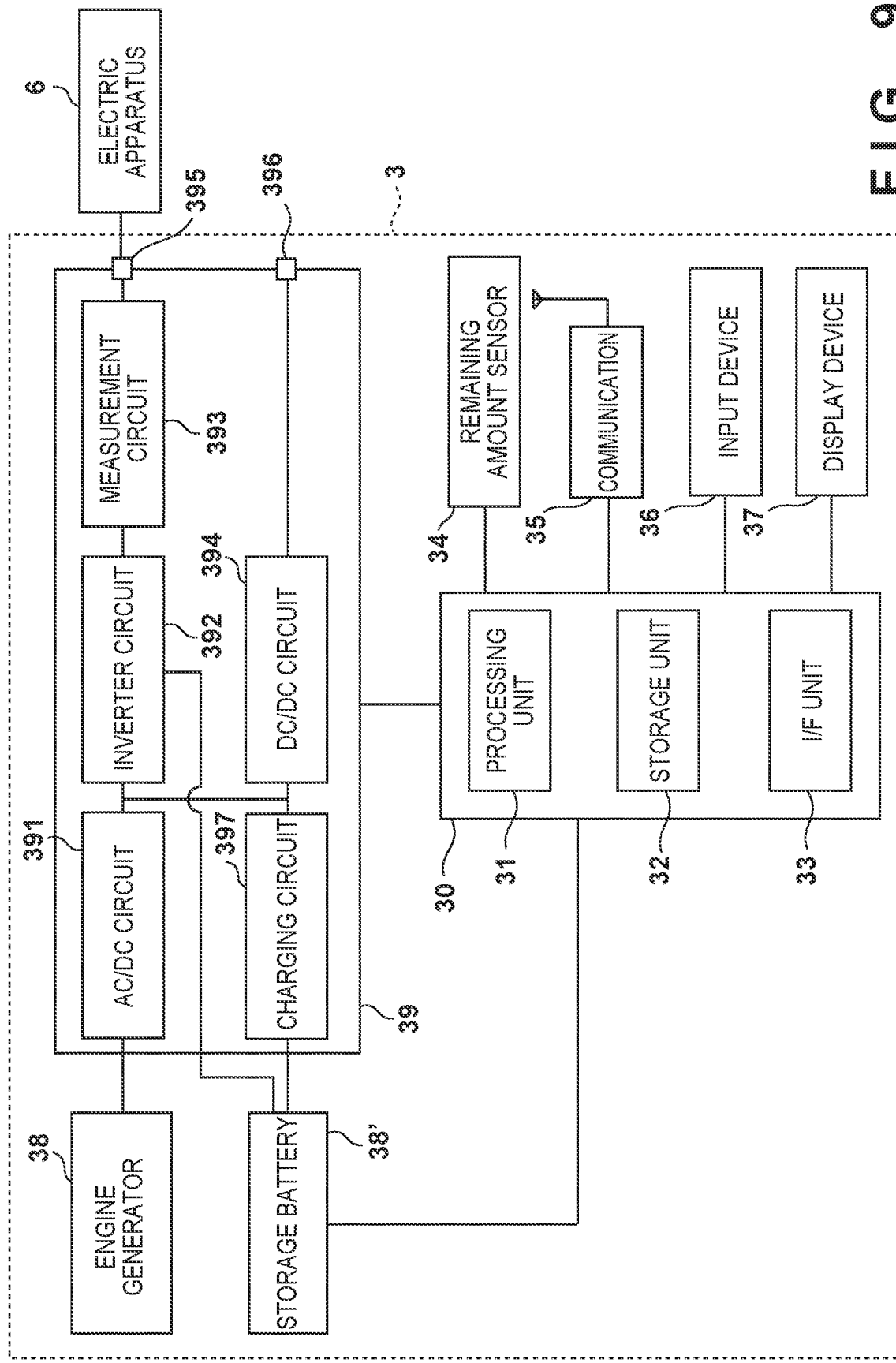
FIG. 9 is a block diagram of another power supply device.

FIG. 9 shows a power supply device 3 including both the engine generator 38 and the storage battery 38'. Description of parts common to the example of FIG. 2 or 8 will be omitted. The inverter circuit 392 converts DC generated by an AC/DC circuit 391 or DC supplied from the storage battery 38' into AC. A charging circuit 397 charges the storage battery 38' based on power generated by the engine generator 38. The power supply device 3 shown in FIG. 9 can supply power stored in the storage battery 38' to an electric apparatus 6 even after fuel of the engine generator 38 runs out.

Summary of Embodiments

1. An information processing device (for example, 2) of the embodiment comprises:

a reception unit (for example, 21, 23, and S11) configured to receive operation information on a power supply device (for example, 3) from the power supply device that supplies power to an electric apparatus (for example, 6) detachably connected thereto;

a ranking unit (for example, 21 and S12) configured to rank a user of the power supply device based on the received operation information; and a setting unit (for example, 21 and S22) configured to set an incentive to the user based on a rank of the ranked user.

According to this embodiment, it is possible to provide a technique that contributes to promotion of utilization of the power supply device.

2. In the embodiment, the operation information includes measurement information indicating measurement results of voltage and current that the power supply device is supplying to the electric apparatus, and the ranking unit identifies a total power supply amount in a predetermined period of the power supply device to the electric apparatus based on the operation information, and ranks the user based on the identified total power supply amount (for example, FIG. 4A).

According to the embodiment, a user with a large total power supply amount is targeted for evaluation, which contributes to further promotion of utilization of the power supply device.

3. In the embodiment, when the power supply device includes an engine generator (for example, 38), the operation information includes:

fuel consumption information indicating a fuel consumption amount of the engine generator; and measurement information indicating measurement results of voltage and current that the power supply device is supplying to the electric apparatus, and the ranking unit identifies fuel consumption of the engine generator based on the fuel consumption information and the measurement information, and ranks the user based on the identified fuel consumption (for example, FIG. 4B).

According to the embodiment, the fuel consumption is targeted for evaluation, which contributes to promotion of efficient utilization of the power supply device.

4. In the embodiment, the ranking unit identifies a power supply time in a predetermined period of the power supply device to the electric apparatus based on the operation information, and ranks the user based on the identified power supply time (for example, FIG. 4C).

According to the embodiment, a user using for a long time is targeted for evaluation, which contributes to further promotion of utilization of the power supply device.

5. In the embodiment, the operation information includes measurement information indicating a measurement result of voltage and/or a measurement result of current that the power supply device is supplying to the electric apparatus, and the ranking unit estimates a type of the electric apparatus based on the measurement information, and ranks the user for each estimated type of the electric apparatus (for example, FIGS. 5A-5D).

According to the embodiment, it is possible to eliminate bias in ranking due to a type of the electric apparatus to which power is supplied, and to make more users ranked higher, which contributes to further promotion of utilization of the power supply device.

6. The information processing device (for example, 2) of the embodiment, further comprises a provision unit (for example, 21, 23, S24) configured to provide information on the incentive set by the setting unit for the user.

According to this embodiment, it is possible for the user to confirm the incentive given to them.

7. An information processing method of the embodiment comprises:

a reception step (for example, S11) of receiving, by a server (for example, 2), operation information on a power supply device (for example, 3) from the power supply device that supplies power to an electric apparatus (for example, 6) detachably connected thereto;

a ranking step (for example, S12) of ranking, by the server, a user of the power supply device based on the received operation information; and a setting step (for example, S22) of setting, by the server an incentive to the user based on a rank of the ranked user.

According to this embodiment, it is possible to provide a technique that contributes to promotion of utilization of the power supply device.

8. An information processing system (for example, 1) of the embodiment is an information processing system comprising a plurality of power supply devices (for example, 3) that supply power to electric apparatuses (for example, 6) detachably connected thereto, and an information processing device (for example, 2) capable of communicating with the power supply devices via a network (for example, 5), wherein the information processing device includes:

a reception unit (for example, 21, 23, and S11) configured to receive operation information on the power supply devices from the power supply devices:

a ranking unit (for example, 21 and S12) configured to rank users of the power supply devices based on the received operation information; and a setting unit (for example, 21 and S22) configured to set incentives to the users based on ranks of the ranked users.

According to this embodiment, it is possible to provide a technique that contributes to promotion of utilization of the power supply devices.

The present invention is not limited to the above embodiments and various changes and modifications can be made within the spirit and scope of the present invention. Therefore, to apprise the public of the scope of the present invention, the following claims are made.

What is claimed is:

1. An information processing device, comprising:
a reception unit configured to receive operation information on a power supply device from the power supply device that supplies power to an electric apparatus detachably connected thereto;
a ranking unit configured to rank a user of the power supply device based on the received operation information; and
a setting unit configured to set an incentive to the user based on a rank of the ranked user,
wherein when the power supply device includes an engine generator, the operation information includes:
fuel consumption information indicating a fuel consumption amount of the engine generator; and
measurement information indicating measurement results of voltage and current that the power supply device is supplying to the electric apparatus, and
wherein the ranking unit identifies fuel consumption of the engine generator based on the fuel consumption information and the measurement information, and ranks the user based on the identified fuel consumption.

2. The information processing device according to claim 1,
wherein the ranking unit identifies a total power supply amount in a predetermined period of the power supply device to the electric apparatus based on the operation information, and ranks the user based on the identified total power supply amount.

3. The information processing device according to claim 1,
wherein the ranking unit identifies a power supply time in a predetermined period of the power supply device to the electric apparatus based on the operation information, and ranks the user based on the identified power supply time.

4. The information processing device according to claim 1,
wherein the ranking unit estimates a type of the electric apparatus based on the measurement information, and ranks the user for each estimated type of the electric apparatus.

5. The information processing device according to claim 1, further comprising
a provision unit configured to provide information on the incentive set by the setting unit for the user.

6. An information processing method comprising:
- a reception step of receiving, by a server, operation information on a power supply device from the power supply device that supplies power to an electric apparatus detachably connected thereto;
- a ranking step of ranking, by the server, a user of the power supply device based on the received operation information; and
- a setting step of setting, by the server, an incentive to the user based on a rank of the ranked user,
- wherein when the power supply device includes an engine generator, the operation information includes:
- fuel consumption information indicating a fuel consumption amount of the engine generator; and
- measurement information indicating measurement results of voltage and current that the power supply device is supplying to the electric apparatus, and
- wherein the ranking step includes identifying fuel consumption of the engine generator based on the fuel consumption information and the measurement information, and ranking the user based on the identified fuel consumption.

7. An information processing system comprising a plurality of power supply devices that supply power to electric apparatuses detachably connected thereto, and an information processing device capable of communicating with the power supply devices via a network,
- wherein the information processing device includes:
- a reception unit configured to receive operation information on the power supply devices from the respective power supply devices;
- a ranking unit configured to rank users of the power supply devices based on the received operation information; and
- a setting unit configured to set incentives to the users based on ranks of the ranked users,
- wherein when the power supply devices each include an engine generator, the operation information includes:
- fuel consumption information indicating a fuel consumption amount of the engine generator; and
- measurement information indicating measurement results of voltage and current that the relevant power supply device is supplying to the relevant electric apparatus, and
- wherein the ranking unit identifies fuel consumption of the engine generator based on the fuel consumption information and the measurement information, and ranks the users based on the identified fuel consumption.

\* \* \* \* \*